Patented Mar. 14, 1939

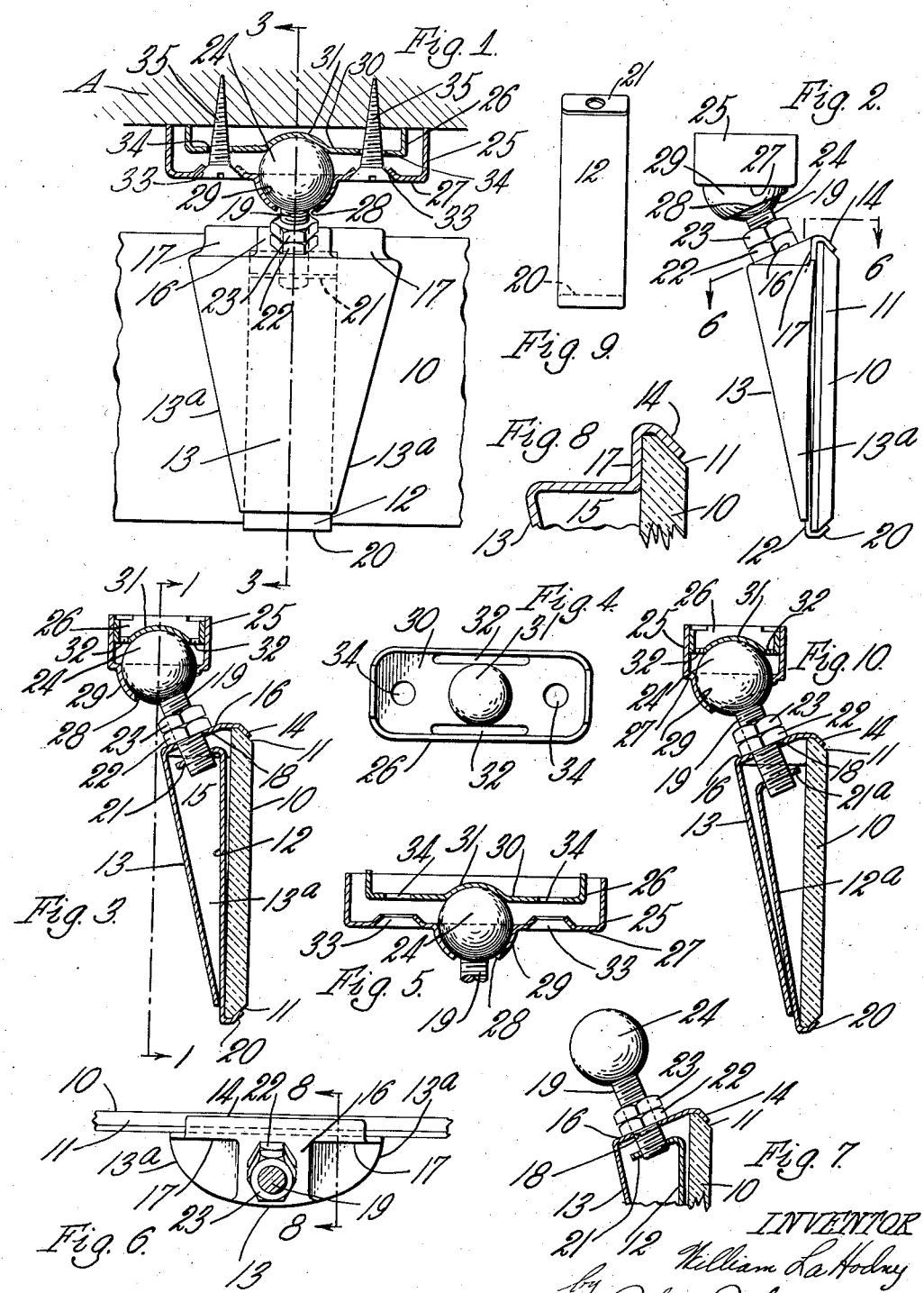

2,150,173

UNITED STATES PATENT OFFICE 2,150,173

SUPPORT

William La Hodny, Buffalo, N. Y., assignor to Standard Mirror Company, Inc., Buffalo, N. Y.

Application September 28, 1935, Serial No. 42,661

13 Claims. (Cl. 88—98)

This invention relates to supports, and particularly to supports for rear view mirror plates and similar articles.

An object of the invention is to provide an improved and simplified support for a rear view mirror plate or the like, with which the supporting means for the mirror plate will occupy a minimum of depth behind the plate and a minimum of area along the length of the plate, with which the distance of the plate from a relatively fixed support may be varied without changing the angular position of the plate with respect to that support, which will utilize simple and easily formed, sheet metal stampings and relatively simple screw machine parts, and which will be relatively strong, durable, light in weight, compact, and inexpensive.

Other objects and advantages will be apparent from the following description of two embodiments of the invention, and the novel features will be particularly pointed out hereinafter in connection with the appended claims.

In the accompanying drawing:

Fig. 1 is a sectional elevation through a rear view mirror support which has been constructed in accordance with this invention, the section being taken approximately along the line 1—1 of Fig. 3;

Fig. 2 is a side elevation of the same;

Fig. 3 is a transverse sectional elevation of the same, the section being taken approximately along the line 3—3 of Fig. 1;

Fig. 4 is a plan of one of the clamping elements for the ball-like head on the supporting stud;

Fig. 5 is a sectional elevation through a portion of the support, the section being taken approximately along the line 1—1 of Fig. 3, but before the parts are secured to the supporting wall as in Fig. 1;

Fig. 6 is a sectional plan of the support, the section being taken approximately along the line 6—6 of Fig. 2;

Fig. 7 is a transverse sectional elevation through a part of the support similar to Fig. 3, but illustrating the position of the parts after the abutment on the supporting stud has been adjusted in order to increase the effective length of the stud;

Fig. 8 is a transverse sectional elevation of a portion of the support and of the mirror plate, the section being taken approximately along the line 8—8 of Fig. 6;

Fig. 9 is an elevation of one of the clamping elements for the mirror plate; and Fig. 10 is a transverse sectional elevation somewhat similar to Fig. 3, but illustrating a slight modification of one of the clamping elements for the mirror plate.

In the embodiment of the invention illustrated in Figs. 1 to 9, the rear view mirror plate 10 to be supported with provision for universal angular adjustment, is of any suitable type and preferably is provided with a peripheral bevelled edge 11. A pair of telescoping elements 12 and 13 are disposed in overlapping relation to one another across the rear face of the mirror plate 10. The element 13 is provided at one end with a flange 14 which is bent into the form of a hook and hooks over the bevelled edge 11 along one edge of the plate 10. The remainder of the element 13 is in the form of a hollow shell, with the cavity 15 of the shell opening toward or facing the rear face of the mirror plate 10.

The section of the wall of the cavity that is adjacent the flanged or hooked end 14, extends rearwardly from the plate 10 at a considerable degree of inclination to the plate 10, the inclination being preferably greater than 45°, so as to provide an inclined or oblique wall 16. The remaining section of wall of the element 13 extends toward the opposite edge of the plate 10. The cavity 15 in the shell has its maximum depth at the end having the hook or flange 14, and its minimum depth at the end nearest the opposite edge of the plate 10. Portions of the wall 16 are deformed or drawn toward the plate 10 to form shoulders 17 which abut against the rear face of the plate 10 adjacent the flange 14, so that the flange 14 will confine the plate 10 against the shoulder portions 17.

The shoulder portions 17 are preferably provided adjacent opposite side edges of the element 13, leaving the central portion of the wall 16 undeformed. The undeformed portion of the wall 16 is provided with an aperture 18, through which the threaded shank of a supporting stud 19 may extend. The other clamping element 12 is disposed within the cavity 15 of the element 13, and extends beyond the shallow end of that cavity where it terminates in a bent end or flange 20 which hooks over the bevelled edge 11 of the plate 10 at the side opposite from the hook 14.

The end of the element 12 which lies within the cavity 15 is bent laterally as at 21, so as to extend approximately parallel to but spaced from the undeformed portion of the wall 16 of the element 13. The threaded end of the stud 19 which extends into the cavity 15 through the aperture 18, is threaded into the flange 21 of the element 12. The element 12 between the flanges 20 and 21 preferably extends in close proximity to the rear face of the plate 10, as shown particularly in Fig. 3.

A nut 22 is threaded upon the stud 19 so as to engage against the outer face of the undeformed portion of wall 16 and act as an abutment reacting against that wall. A lock nut 23 may also be provided on the stud 19 so as to prevent unintentional turning of the abutment nut 22 from its different adjusted positions. When the stud 19 is rotated, it will turn idly in the aperture 18 in the wall 16, and the end of the stud which extends into the cavity 15 and threads into the flange 21 of the element 12 will shift the element 12 in a direction crosswise of the plate 10, because the flange 21 acts as a nut on the stud 19 which, being held from turning by this engagement with the plate 10, must move endwise along the stud 19.

When the stud 19 is rotated in one direction, the reaction of the abutment nut 22 against the wall 16 will draw the element 12 toward the flange 14, and cause an increase in the degree of overlap of the elements 12 and 13, or in other words a decrease in the distance between the flanges 14 and 20. The plate 10 is thus clamped firmly between the flanges 14 and 20 or released by rotation of the stud 19. The stud 19 extends upwardly from the wall 16, preferably at a small inclination to the rear face of the mirror plate 10, that is, at an inclination preferably less than 45°, and the upper or outer end of the stud 19 terminates in a ball-like head 24 by which the stud 19 may be supported for limited universal angular adjustment.

The support for the head 24 preferably includes a pair of nesting and telescoping, cup-like elements or members 25 and 26 with the open faces of the elements 25 and 26 facing in the same direction. The bottom wall 27 of the element 25 has an aperture 28 through which the stud 19 extends, and the portion of the bottom wall which surrounds the aperture 28 is drawn downwardly to provide a partially spherical seat 29 in which the head 24 is received. The axis of the opening or aperture 28 is preferably at an angle to the plane of the bottom wall 27, so that the stud 19 may extend from the element 25 at an angle or inclination thereto and yet be capable of limited angular adjustment in different directions from that position. The aperture 28 is for this purpose made larger than the stud 19 so that head 24 may roll or rock in its seat 29.

The bottom wall 30 of the element 26 engages the head 24, and confines it to the seat 29, and the portion of the wall 30 which engages the head 24 may be drawn upwardly to form a concave seat 31 to fit the head 24. When the element 26 is within the element 25 and confining the head 24 to the seat 29, the open face or edge of the element 26, particularly at the ends thereof, will project outwardly of the element 25 to a slight extent, so that when the telescoping elements 25 and 26 are secured against a wall A as in Fig. 1, the element 26, particularly at the ends thereof, will be forced further into the element 25 and will exert considerable pressure on the head 24, so as to frictionally hold the head 24 in different angular positions into which it may be rocked.

The bottom wall 30 of the element 26 is provided along opposite sides with slots 32. These slots are disposed on opposite sides of the seat 31. As the element 26 is forced downwardly into the element 25 during the attachment to the wall A, the portion of the bottom wall 30 of the element 26 at opposite sides of the seat is freely flexible, so that the section of wall 30 adjacent to seat 31 may bow or be sprung upwardly and provide a resilient, yielding pressure on the head 24, which pressure does not change greatly through a limited additional movement of the element 26 into the element 25. Thus the head 24 of the stud 19 will not only be frictionally held in different angular positions into which it may be rocked, but the holding pressure will be such that the head 24 may be easily moved and will not be materially affected by irregularities in the surface of the wall A against which the elements 25 and 26 are clamped.

The holding pressure on the head 24 will continue even under considerable wear between the head 24 and the seats 29 and 31. Any suitable means may be provided for confining the elements 25 and 26 to the wall A, but by way of example, the bottom wall 27 is provided with apertures 33 on opposite sides of the seat 29, and the bottom wall 30 of the element 26 is provided with similar but aligned apertures 34, so that attaching screws 35 may be passed upwardly through the aligned apertures 33 and 34 into the wall A, as shown in Fig. 1. The relation of the elements 25 and 26, before attachment to the wall A, is shown in Fig. 5, and the relation, after the parts are attached to the wall A, is shown in Fig. 1.

By adjusting the nuts 22 and 23 along the stud 19, the effective length of the stud 19 may be varied, that is, the length of the stud 19 outside of the element 13, such adjustment being shown in Fig. 7, where the effective length of the stud 19 is increased over that shown in Figs. 1, 2 and 3. By this adjustment, the plate 10 is disposed at different distances from the head 24.

In Fig. 10 a slight modification of the invention is illustrated, in which the element 12a is similar to element 12, except that instead of having the flange 21 extending in the opposite direction from the flange 20, as in Figs. 1 to 9, the corresponding flange 21a extends generally in the same direction, as the flange 20, so that the main portion of the element 12a, instead of lying in close proximity to the rear face of the plate 10, as in Figs. 1 to 9, will lie further from the plate 10 and in closer proximity to the element 13. The flange 21a, however, extends parallel to the undeformed portion of the wall 16 and is threaded to the stud 19, as in Figs. 1 to 9. The action is the same as explained in connection with Figs. 1 to 9.

In both embodiments of the invention, as shown in Figs. 1 to 10, the element 13 preferably has side walls 13a which extend into proximity to the rear face of the plate 10 and form the side walls of the cavity 15, and the side flanges 13a continue lengthwise of the element 13 until they engage and embrace or straddle that end of the element 12 which is nearest to the flange 20, preventing lateral movement of the element 12 with respect to the element 13.

The use and operation of the improved support should be obvious from the foregoing description, but it will be noted that the mirror plate may be clamped or released from the improved support, merely by rotating the stud 19 to cause a change in the degree of overlapping of the elements 12 and 13 in Figs. 1 to 9, or the elements 12a and 13 in Fig. 10. The effective length of the stud 19 may be varied so as to locate the mirror plate 10 further from or nearer to the wall A merely by adjusting the nuts 22 and 23 and turning the stud 19 until the plate 10 is firmly clamped. A limited universal adjustment of the mirror plate 10 is possible by means of the mounting of the head 24 between the elements 25 and 26, and plate 10 is yieldingly held in different adjusted positions by friction created through pressure on the head 24 by the elements 25 and 26, which pressure will not vary greatly over an appreciable difference in the extent of movement of the element 26 into the element 25 when those elements are secured to the wall A, as shown in Fig. 1.

It will be understood that various changes in the details and arrangements of parts, which have been herein described and illustrated by way of example only, in order to explain the nature of the invention, may be made by those skilled in the art within the principle and scope of the invention, as expressed in the appended claims.

I claim as my invention:

1. A support for a rear view mirror plate or article of similar shape, which comprises an element hooked at one end for engagement over an edge of said plate, formed to extend along a face of said plate towards the opposite edge of said plate, and between its ends spaced from said plate, another element hooked at one end for engagement over the opposite edge of said plate, extending along said face, and overrunning with the first element, and a supporting stud extending generally in the direction of overrunning movement of said elements as said elements move to clamp the edges of said plate between their hooked ends, said stud passing through and having rotatable bearing in the spaced portion of the first mentioned element and having a threaded end threaded through the other element, said stud having, between its ends, an abutment adjustable in a direction endwise along the stud and engaging the first mentioned element at the face thereof opposite from said plate, whereby upon turning said stud, said elements may be drawn in a direction to clamp the plate between the hooked ends, and by adjustment of the abutment the effective length of the stud away from said elements may be varied.

2. A support for a rear view mirror plate or similar artitcle, comprising a pair of overlapping sheet metal elements to be disposed across a face of said plate, one of said elements having an end bent in the form of a hook to engage over one edge of said plate, and the other of said elements having its opposite end also bent in the form of a hook to engage over the opposite edge of said plate, both of said elements having portions thereof in the overlapping zone deformed in directions inclined to said plate and nesting with one another, a supporting stud passing through the outer of said overlapping elements at the deformed portion, and threaded to the deformed portion of the under element, said stud having an abutment engaging against the outer face of the outer element at the deformed portion thereof, whereby rotation of said stud in one direction will draw said deformed portions toward one another and clamp said elements to said plate, and means connected to the outer end of said stud for supporting it and through it said elements and said plate.

3. A support for a rear view mirror plate or similar article, comprising a pair of overlapping sheet metal elements to be disposed across a face of said plate, one of said elements having an end bent in the form of a hook to engage over one edge of said plate, and the other of said elements having its opposite end also bent in the form of a hook to engage over the opposite edge of said plate, both of said elements having portions thereof in the overlapping zone deformed in directions inclined to said plate and nesting with one another, a supporting stud passing through the outer of said overlapping elements at the deformed portion, and threaded to the deformed portion of the under element, said stud having an abutment adjustable in an endwise direction thereon and engaging against the outer face of the outer element at the deformed portion thereof, whereby rotation of said stud in one direction will draw said deformed portions toward one another and clamp said elements to said plate, and means connected to the outer end of said stud for supporting it and through it said elements and said plate.

4. A support for a rear view mirror plate or similar artitcle, comprising an element formed of sheet metal and capable of abutting against a face of said plate, with a hooked flange at one end for engagement with one edge of said plate, said element having a cavity formed therein between the opposite end thereof and a point adjacent to but spaced from the hooked end, with the cavity facing said plate, the cavity at the end adjacent the hooked flange having a wall extending in a direction inclined to said plate, and the cavity decreasing in depth toward the unflanged end, a second element disposed in said cavity so as to project from the shallow end thereof and at its projecting end hooked for engagement over the opposite edge of said plate, a stud having between its ends an abutment engaging said wall and a shank passing through said wall into said cavity and threaded to said second element, whereby rotation of said stud will cause an overlapping travel of said elements and will clamp said plate between them, and means connected to the outer end of said stud for supporting it for angular adjustment.

5. A support for a rear view mirror plate or similar article, comprising a sheet metal element having at one end a flange hooked for engagement over an edge of said plate, the body of said element extending towards the opposite edge of said plate, said body having a portion between its ends offset from a plane joining its ends and progressively decreasing in depth of offset from a maximum adjacent its hooked end towards its opposite end, said body at its end of maximum depth having an aperture therethrough, a second sheet metal element having one end flanged to engage the opposite edge of said plate and extending along the same face of said plate in overrunning relation to and beneath the first element, and having a portion extending for some distance approximately parallel to the offset portion of the first element and then flanged laterally thereto, a supporting stud extending through said aperture and having threaded engagement with the laterally flanged portion of the second element, and also having an abutment engageable with the outer face of said first element, whereby upon rotation of said stud and engagement of said abutment with said outer element, the elements may be clamped to opposite edges of said plate, and means connected to the outer end of said stud for supporting it for limited universal movement.

6. A support for a rear view mirror plate or similar article, comprising a sheet metal element having at one end a flange hooked for engagement over an edge of said plate, the body of said element extending towards the opposite edge of said plate, said body having a portion between its ends offset from a plane joining its ends and progressively decreasing in depth of offset from a maximum adjacent its hooked end towards its opposite end, said body at its end of maximum depth having an aperture therethrough, a second sheet metal element having one end flanged to engage the opposite edge of said plate and extending along the same face of said plate in overrunning relation to and beneath the first element, and having a portion extending for some distance approximately parallel to the offset portion of the first element and then flanged laterally thereto, a supporting stud extending through said aperture and having threaded engagement with the laterally flanged portion of the second element, and also having an abutment engageable with the outer face of said first element, whereby upon rotation of said stud and engagement of said abutment with said outer element, the elements may be clamped to opposite edges of said plate, and means connected to the outer end of said stud for supporting it for limited universal movement, said abutment being adjustable along said stud, whereby the extent of projection of the stud from said first element may be varied.

7. A support for a rear view mirror plate or similar article, comprising a pair of overlapping elements that may be disposed across a face of said plate, one element being hooked for engagement over one edge of said plate and the other element being hooked for engagement over the opposite edge of said plate, a supporting stud disposed to extend in a direction from one of said edges towards the other, and at one end passing through and rotatably engaging one of said elements and having an abutment bearing on that element, said stud being threaded to the other of said elements in a manner to move them into engagement with said opposite edges of said plate when said stud is rotated about its longitudinal axis in one direction, one of said elements having a guide portion which slidingly engages the other of said elements and acts to limit relative movement of said elements laterally of their direction of movement in clamping said plate and parallel to said plate, while guiding the elements for relative movement in said direction between said edges.

8. A support for a rear view mirror plate or similar article, comprising a pair of overlapping elements that may be disposed across a face of said plate, one element being hooked for engagement over one edge of said plate and the other element being hooked for engagement over the opposite edge of said plate, a supporting stud disposed to extend in a direction from one of said edges toward the other of said edges, threaded to one of said elements and having an abutment reacting upon that face of the other of said elements which will cause relative movement of said elements, upon rotation of said stud in one direction, in a direction to clamp said elements to said opposite edges of said plate, said elements being disposed in superposed relation to one another and against said face, and having interengaging guide means that guide said elements in relative movements in said direction between said edges and prevent substantial relative movement of said elements crosswise of said direction.

9. In a rear view mirror or the like, a support for the mirror plate thereof which comprises a casing member of sheet metal extending across the back of said plate with its side edges closely adjacent the rear face of said plate and its interior zone spaced away from the rear face of said plate to provide a housing space, said casing having, at one end, a hook for engagement over one edge of said plate, a clamping plate within said housing space and having a hook at the end opposite from said one end of the casing, for engagement over the other edge of said mirror plate in opposition to the hook of said casing, a supporting stud extending endwise of itself into said casing generally in a direction making an acute angle to the plate and from one of said edges of said plate towards the opposite edge of that plate, and at its inner end threaded to said clamping plate, said stud having an abutment engageable with said casing to limit endwise movement of said stud in said casing, rotation of said stud in one direction causing relative movement of said casing and clamping plate in a direction to draw said hooks toward one another and clamp said mirror plate between them.

10. A support for a rear view mirror plate or similar article comprising a pair of overrunning sheet metal elements, disposed face to face, the outer ends of said overrunning elements being formed for engagement with a mirror plate to be supported when the plate is disposed approximately flat against said elements, and said elements are relatively adjusted in the direction of overrunning to engage and support said mirror, one of said elements being flanged along its side edges and engaging with the other element to keep the elements aligned with one another during said relative adjustment of the elements in the direction of overrunning and means connecting said elements and operable selectively for producing said relative adjustment and having as its operating member a supporting stud extending therefrom generally in the direction of said overrunning and said relative movement.

11. In a rear view mirror, a support for a mirror plate comprising a casing member of sheet metal extending substantially across the back of said plate in a direction from edge to edge of the plate, and with its side edges disposed closely adjacent to the rear face of said plate and with its central portion spaced from said plate to provide a housing space, said casing member at one end being formed for engagement with one side edge of said plate and being open at its other end, a clamping plate in said housing space, extending generally in the same direction as said housing space, and through said open end of said casing member and formed at its outer end for engagement with said mirror plate in opposition to the engagement of the opposite end of said casing member with the opposite edge of said mirror plate, and supporting means connected to said clamping plate and said casing member for supporting the same and operable selectively for adjusting said clamping plate within said housing space in a direction to anchor said mirror plate between the ends of said casing member and clamping plate, said means including as the operating element thereof a supporting stud extending outwardly from said casing member generally in the direction between said edges of said mirror plate.

12. In a rear view mirror or the like in which a mirror plate is supported in a selected position, a supporting device for said plate comprising a casing member of sheet metal extending across the back of said plate approximately between the edges of said plate, and having its side edges extending into close proximity to the rear face of said mirror plate, the central portion of said casing member being spaced from the rear face of said mirror plate sufficiently to provide a housing space facing said mirror plate, said casing member being formed adjacent one end for supporting engagement with said mirror plate adjacent one edge of the latter and being open into said housing space at its opposite end, a clamping plate disposed in said housing space, extending outwardly through the open end of said casing member and at its outer end being also formed for engagement with said mirror plate in opposition to the engagement of said mirror plate by the opposite end of said casing member, and a supporting stud extending through said casing member into said housing space, generally in the direction between the portions of said member and clamping plate that are formed for engagement with the mirror plate, and threaded to said clamping plate, said stud having a shoulder bearing upon the outer face of said casing member for moving said clamping plate in a direction relatively into and out of said casing member and clamping said mirror plate between said casing member and said clamping plate, upon rotation of said stud to thread it into or out of said clamping plate.

13. In a rear view mirror or the like in which a mirror plate is supported in a selected position, a supporting device for said plate comprising a casing member of sheet metal extending across the back of said plate approximately between the edges of said plate, and having its side edges extending into close proximity to the rear face of said mirror plate, the central portion of said casing member being spaced from the rear face of said mirror plate sufficiently to provide a housing space facing said mirror plate, said casing member being formed adjacent one end for supporting engagement with said mirror plate adjacent one edge of the latter and being open into said housing space at its opposite end, a clamping plate disposed in said housing space, extending outwardly through the open end of said casing member and at its outer end being also formed for engagement with said mirror plate in opposition to the engagement of said mirror plate by the opposite end of said casing member, the inner end of said plate having a lateral flange, and a supporting stud extending through said casing member into said housing space and there threaded to said lateral flange of said clamping plate, and by reaction on said casing member operable, when rotated, to cause relative movement of said casing member and clamping plate in the direction of overrun to engage and support said mirror plate, said stud extending away from said casing member in a direction generally that of said relative movement of said casing member and clamping plate.

WILLIAM LA HODNY.